United States Patent [19]

Yamagishi

[11] Patent Number: 5,151,988
[45] Date of Patent: Sep. 29, 1992

[54] INTERSYSTEM DATA BASE SHARING JOURNAL MERGE METHOD

[75] Inventor: Mamio Yamagishi, Yokohama, Japan

[73] Assignee: Hitachi, Ltd., Tokyo, Japan

[21] Appl. No.: 579,110

[22] Filed: Sep. 6, 1990

Related U.S. Application Data

[63] Continuation of Ser. No. 154,952, Feb. 10, 1988, abandoned.

[30] Foreign Application Priority Data

Feb. 18, 1987 [JP] Japan .................................. 62-33279

[51] Int. Cl.⁵ .............................................. G06F 15/40
[52] U.S. Cl. ............................... 395/600; 364/DIG. 1; 364/282.1; 364/281.3; 364/281.4; 364/281.5; 364/228.4
[58] Field of Search ................ 395/600, 650, 200, 575

[56] References Cited

U.S. PATENT DOCUMENTS

| 4,399,504 | 8/1983 | Obermarck et al. | 364/200 |
| 4,408,273 | 10/1983 | Plow | 364/200 |
| 4,410,940 | 10/1983 | Carlson et al. | 364/200 |
| 4,584,640 | 4/1986 | MacGregor et al. | 395/600 |
| 4,590,555 | 5/1986 | Bourrez | 364/200 |
| 4,621,326 | 11/1986 | Rawlins | 364/408 |
| 4,642,756 | 2/1987 | Sherrod | 364/200 |
| 4,646,231 | 2/1987 | Green et al. | 364/200 |
| 4,791,554 | 12/1988 | Hirota et al. | 395/600 |
| 4,819,156 | 4/1989 | DeLoime et al. | 364/200 |
| 4,823,261 | 4/1989 | Bank et al. | 364/200 |
| 4,823,304 | 4/1989 | Frantz et al. | 364/900 |
| 4,875,159 | 10/1989 | Cary et al. | 395/600 |

FOREIGN PATENT DOCUMENTS

59-21057 5/1984 Japan .
59-85554 5/1984 Japan .

Primary Examiner—Kevin A. Kriess
Attorney, Agent, or Firm—Fay, Sharpe, Beall, Fagan, Minnich & McKee

[57] ABSTRACT

A plurality of shared files (10) are accessible by each of a plurality of host processors (30a, 30b, 30c). Each host processor includes a data base access system (36) for accessing a selected record of the shared files. A journal merge key table (38) stores transaction sequence information, particularly a count of the number of transactions performed by each of the processor and the number of times each processor has been down and restarted. Each time the data base access system starts a transaction to access and modify the selected record, the lock manger communicates with the other processors through a communications unit (40). The lock communication blocks the other processors from accessing the same record and communicates more current transaction count information to the other processors. Acknowledgement signals from the other processors return the most current transaction count information therefrom. The processor undertaking the transaction creates a journal record which includes the transaction and the sequence information, particularly the count information. The journal record is stored in a journal file (50) dedicated to the processor. By comparing the count information that is stored with transaction records in other files, the sequence in which the transactions occurred can be readily determined.

19 Claims, 7 Drawing Sheets

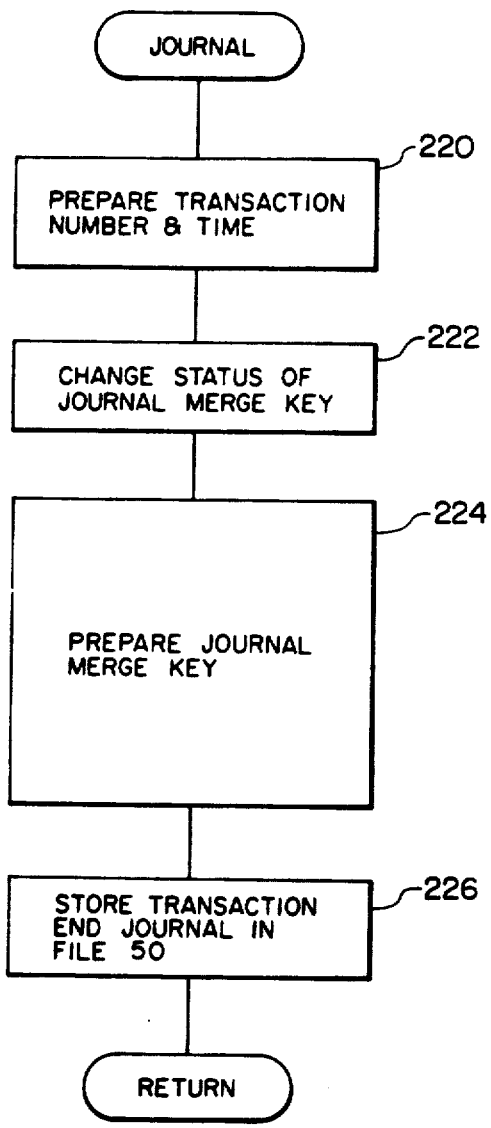
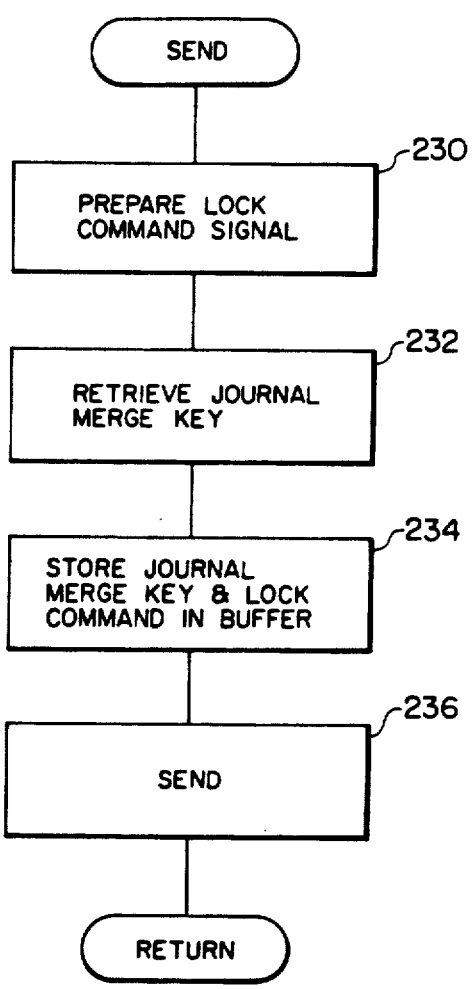

INTERSYSTEM DATA BASE SHARING JOURNAL MERGE METHOD

This application is a continuation of application Ser. No. 154,952, filed Feb. 10, 1988, now abandoned.

BACKGROUND OF THE INVENTION

The present invention relates to the art of computer backup and safety systems. It finds particular application in conjunction with computerized banking in which a single central set of customer data files are accessed by a plurality of processor systems and will be described with particular reference thereto. However, it is to be appreciated, that the present invention is applicable to other computer systems and methods, particularly those in which large numbers of transactions are entered through a plurality of processors to update or modify a common set of files or data base systems.

Heretofore, information was stored in one or more computer files. Originally, a single computer or processor accessed the files to enter, withdraw, or modify the stored data. To protect the information stored in the files from system failures, errors, malicious tampering, machine failure, and the like, back-up copies of the data were made on a regular basis. Further in on-line systems, a record was commonly made of each transaction. In this manner, the status of the information stored in the files at any point in time could be recreated. Commonly, the processor included a journal file which kept a journal or backup copy of each of the transactions, i.e. operations which modified, entered, or deleted data from the files. More specifically, the processor commonly extracted information from the files, modified it during the transaction, and returned the modified or new data to the files. The journal record commonly included at least two of the data as retrieved from the files, the transaction, and the data which was returned to the files. In this manner, the journal provided a record of all transactions which was available for reconstructing the files, the sequence of transactions, and the like.

As the size of the computing systems grew and the number of transactions increased, it became impractical to access the files with a single computer. Accordingly, systems were developed for enabling a plurality of computers to access or share a single set of data files. A journal record of all transactions was still maintained. Because the same record could be modified several times, each time by a different one of the computers, it was necessary for the journal file to keep a record of the transactions in order. To this end, a journal processor or computer was interconnected with the shared files and with the plurality of computers or processors to monitor every transaction. The journal processor maintained a journal file in which the status of each record was recorded before and after each transaction. See for example Japanese patent application number 85 554/1984 to Nomiyama, laid opened May 17, 1984.

One of the problems with this prior art system resided in the cost and complexity of the journal processor. In order to interact with and record the transactions from a plurality of large processors or computers, a large, high speed, computer was required for the journal processor. The journal processor contributed not only to the cost of the system, but also to the complexity.

The present invention contemplates a new and improved computer system which enables a plurality of data processors to access shared data resources.

SUMMARY OF THE INVENTION

In accordance with one aspect of the present invention, a computer system is provided. A plurality of files store information or data records. A plurality of processors perform transactions each of which adds, deletes, or modifies the information stored in one of the files. The processors are connected with the files in such a manner that each processor is able to alter each of the files. A plurality of journal files are provided for storing a record of each transaction. Each journal file is interconnected with one of the processors to store the transactions therefrom. A communications unit is connected with the processors for providing communication therebetween in such a manner that at least transaction sequence data is exchanged among the processors and selectively recorded in the journal files.

In accordance with another aspect of the present invention, a method of computing is provided. Data records are stored in a plurality of files. Each of a plurality of processors conduct transactions which alter data records stored in the files. Transaction information is stored for transactions arising from each processor in a separate journal file. Transaction sequence information regarding an order in which transactions are conducted is exchanged among the processors and recorded in the journal files in association with each transaction.

In accordance with another aspect of the present invention, a journal merge method is provided for a data base sharing system. The system includes a plurality of data processors which are interconnected by a communications unit for transferring information thereamong. A plurality of files store data records which are accessible to the processors to be altered in transactions. Each of the data processors includes an on-line data base access system for selectively accessing a selected one of the shared data records and an associated journal file unit for storing a record of each transaction. In the journal merge method, sequence information is exchanged among the processors. After each transaction, a record of the transaction and the sequence information is stored in the corresponding journal file unit. By comparing the sequence information stored in conjunction with each transaction record in the journal files, the sequence in which the transactions occurred can be recreated.

One advantage of the present invention resides in its more efficient use of computer resources.

Another advantage of the present invention resides in a new and improved journal merge key system which permits distributed journal files to be maintained.

A further advantage of the present invention resides in the elimination of a central journal file with its accompanying costs and complexity.

Yet another advantage of the present invention resides in a new and more efficient journal merger system.

Still further advantages of the present invention will become apparent to those of ordinary skill in-the-art upon reading and understanding the following detailed description of the preferred embodiments.

BRIEF DESCRIPTION OF THE DRAWINGS

The invention may take form in various steps and arrangement of steps or in various components and arrangements of components. The drawings are only for purposes of illustrating a preferred embodiment and are not to be construed as limiting the invention.

FIG. 5 is a flow chart illustrating processing of a transaction;

FIG. 6 is a flow chart illustrating lock manager operation for transferring exclusive control to a selected data record to one of the processors;

DETAILED DESCRIPTION OF THE PREFERRED EMBODIMENT

Figure 1:
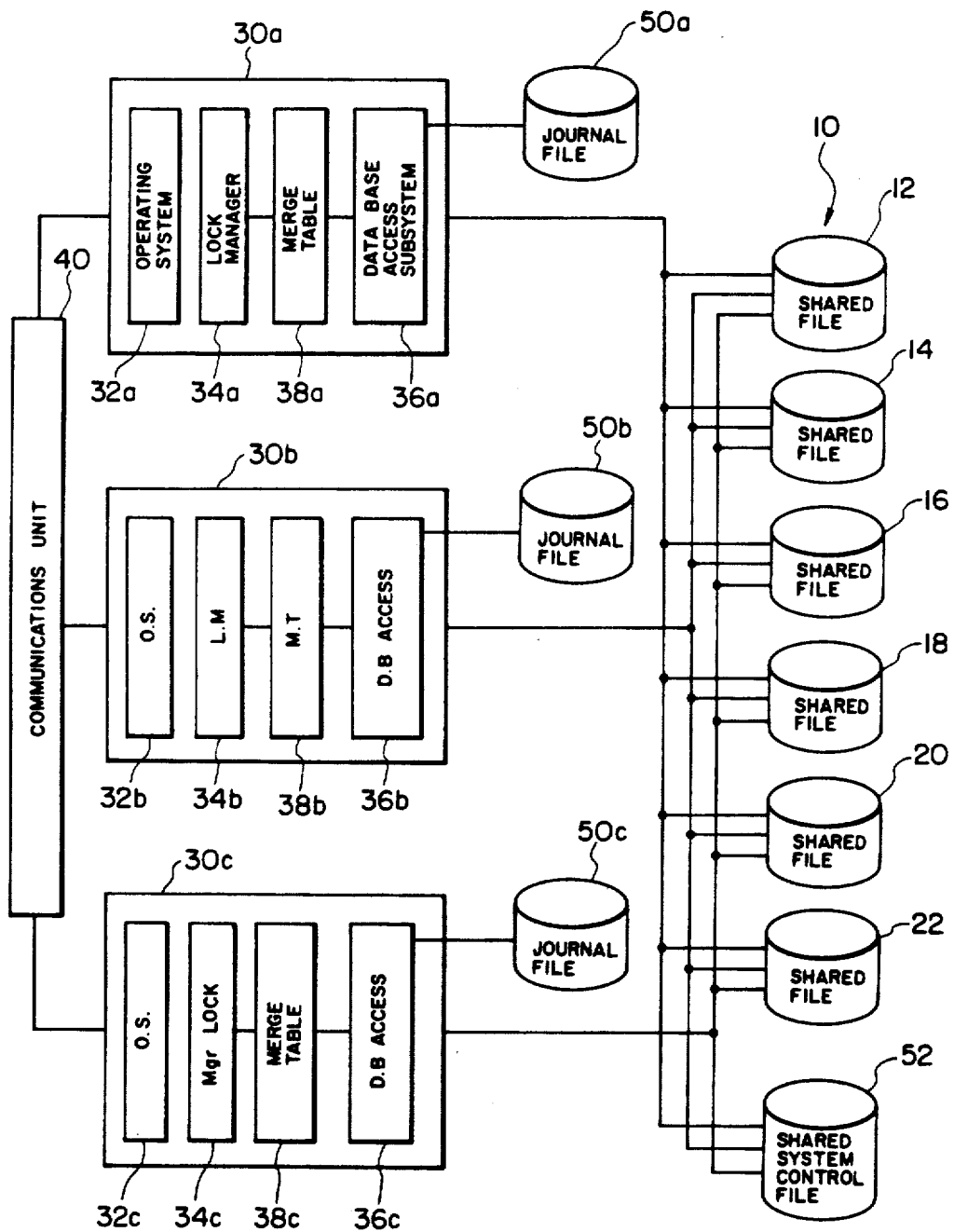
FIG. 1 is a block diagram illustrating a computer system in accordance with the present invention.

With reference to FIG. 1, a central data storage area 10 is provided. The central storage area includes a plurality of shared files 12-22 which store information in the form of data records. For example, each data record may be the bank balance or other financial records of a single bank customer. The financial information for each customer or account are uniquely stored by account number in the files 12-22.

A plurality of data processors or host computers 30a, 30b, 30c each selectively access the shared files 12-22 of the central data storage area. Each time the host processors accesses one of the shared files, it normally conducts a transaction in which the accessed data record is revised, e.g. deleted, added, or revised. For example, a plurality of automatic teller machines may be interconnected with each of the host processors. The host processors may each be associated with one branch of a bank to handle all of the automatic teller machines and other financial records transferred by that branch. Typically, a customer will call up his account and verify his right to access it with a personal identification number or the like. The host processor associated with the automatic teller machine accesses the appropriate data record in the central data storage area and retrieves it. The customer then conducts a transaction in which account balance may be reduced, such as by withdrawing cash or transferring money to other accounts, in which the balance is increased by depositing money, or the like.

Each host processor includes an operating system 32a, 32b, 32c which controls the operation of the processor. Lock managers 34a, 34b, 34b enable a single one of the host processors to obtain access to a given portion of the shared files 12-22, such as a selected data record. Two host processors are prevented from modifying the same data record at the same time by permitting the first host processor which obtains access to the data record to exclude or lock out the other host processors until the transaction is completed. Each host processor further includes one or a plurality of sub-systems or data base access systems 36a, 36b, 36c for interacting with the central, shared data resources 10.

Each host processor also includes a merge table 38a, 38b, 38c which stores a key or sequence information for establishing the order in which transactions occurred. The merge tables store data, much of it acquired from the other host processors, which is stored in conjunction with the journal or back-up storage of each transaction to establish the sequence of the transactions.

A central communications unit 40 interconnects the host processors to communicate with each other. The lock managers communicate with each other to establish exclusive control of a selected record. The merge tables communicate transaction sequence information which describes the order or sequence of the transactions.

The host processors 30a, 30b, 30c each includes a journal file unit 50a, 50b, 50c, respectively. The journal files store a record of each transaction and a sequence key from the journal merge table of the associate host processor. The transaction record may include the customers account balance before the transaction and after the transaction.

The host processors through their data base access systems 36 also communicate with a shared system control file 52 in which merge table information regarding transaction sequence is stored. The merge sequence information stored in the shared system file 52 is redundant with the data stored and accessible from the other host processors. However, in the unlikely event that all host computers are down concurrently, the other host processors would be unavailable to the first host processor to be brought back up. The shared system control file 52 provides an assured sources of the sequence information.

The data base access systems 36 perform processing in units each denoted as a "transaction". Concurrently with the performance of each transaction, a user arbitrary journal of business history indication, a file journal of update history information, a transaction end journal, a transaction end history, and the like are stored in the journal file 50 of the corresponding host processor. Each of the data base access systems 36 has an end of transaction counter. The end of transaction count, which is stored in the merge table 38, indicates order of the transactions of a given host processor. By transferring the most recent end transaction count from the other host processors into the merge table, a composite of end transaction counts is created in each merge table. This composite of end transaction counts is stored with each transaction history in the associated journal file to provide an indication of the transaction sequence. Because this information is unavailable from a processor which is down, the end count information may become ambiguous as to sequence of order. Accordingly, each merger table further stores down/restart account information for each host processor.

Figure 2:
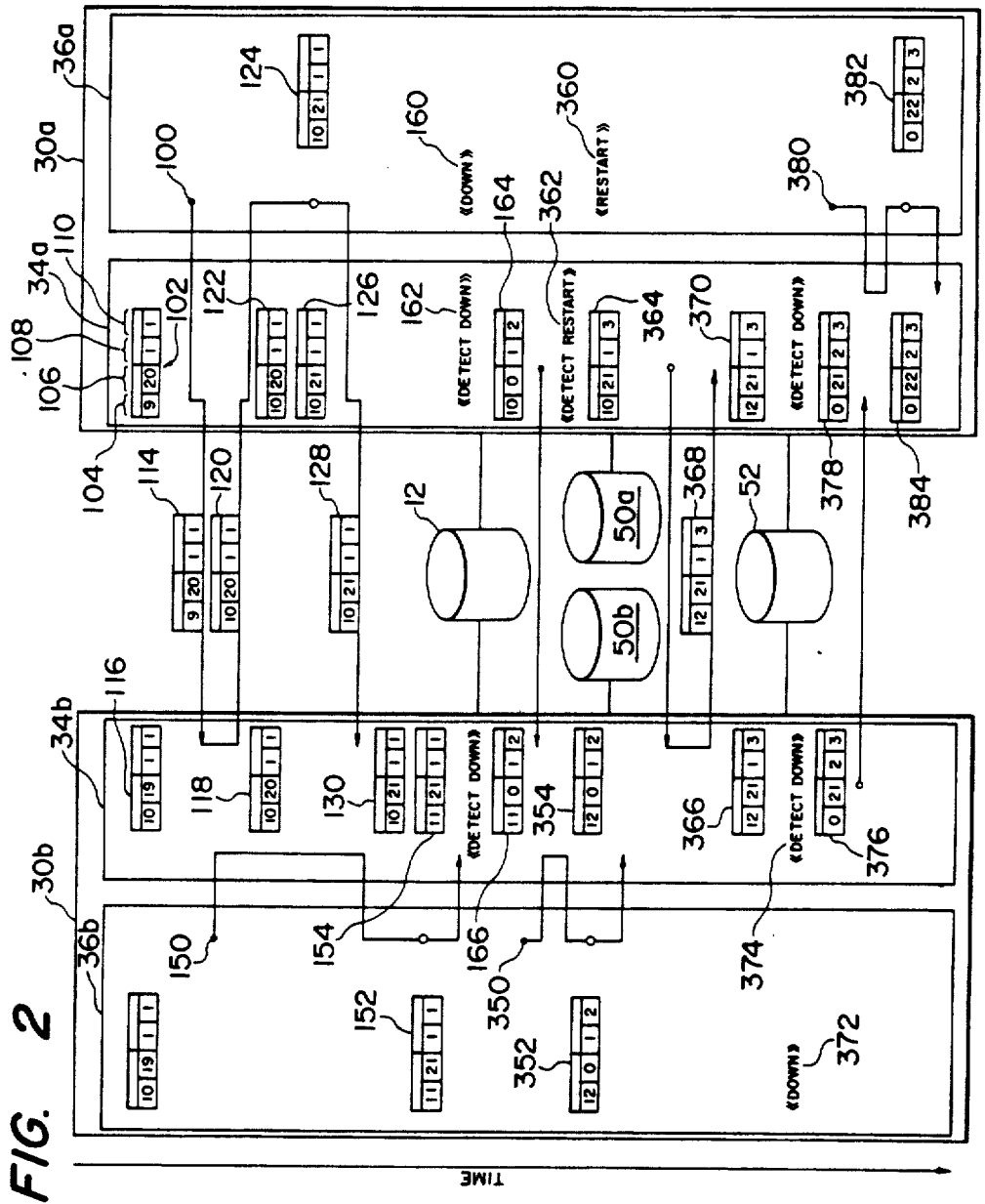
FIG. 2 is a diagrammatic illustration of a time lapse sequence for operating a simplified version of the computer system of FIG. 1.

In FIG. 2, the method of operating the computer system of FIG. 1 is illustrated. However, for simplicity of illustration, only two of the host processors 30a and 30b are illustrated. It is to be appreciated that the illustrated principles are equally applicable to three or more host processors. A consumer initiates a transaction 100 on one of the automatic teller machines connected with the host processor 30a. The lock manager 34a retrieves the most recent journal merge key 102 stored in the merger table 38a. The journal merge key 102 includes a first transaction end count segment 104 which indicates the number of the transactions performed by the host processor 30b and a second transaction end count 106 which indicates the number of transactions previously performed by the host processor 30a. The key also includes a first restart count 108 indicating a number of restarts of the host processor 30b and a second restart count 110 indicative of the number of restarts of the host computer 30a. At 112, the lock manager 34a sends a message 114 to the lock manager 34b. The message includes the retrieved sequence key 102, an indication of the record over which exclusive control is to be assumed, and a lock demand signal.

The lock manager 34b receives exclusive control message 114 and compares the received sequence key 102 with the most recent sequence key 116 in its merger table 38b. If the transaction end count 104 or the down restart count 108 in the received message are smaller than the corresponding counts in the key 116 retrieved from the second host processor's merge table, the counts in the communication or message are updated. Moreover, if the transaction end or restart count for the first host processor 30a are larger in the message than in the key 116 retrieved the second lock manager 34b, the sequency key 118 in the merger table 38b is updated.

The second lock manager 34b acknowledges receipt of the exclusive control message by returning or an acknowledgement message 120 including the updated sequence key 118. The second lock manager 34b prevents the second host processor 30b from gaining access to the identified data record until it receives confirmation that the first host processor 30a has finished its transaction. Upon receipt of the acknowledgement signal, the first lock manager 34a updates the sequence key 122 its merger table 38a in accordance with updated sequence key 120 of the acknowledgement.

After first merger table 38a is updated, the first data base access system 36a performs the selected transaction. That is, the data base access system accesses the shared files 12–22 and makes the appropriate modification in the data stored in the selected data record. On completion of the transaction, the data base access system updates the transaction end count 106 creating a most recent sequence key 124. In the illustrated example, the transaction end count 106 increases from 20 to 21. The first lock manager 34a similarly updates the end count of the sequence key 126 in the merge table and transmits a lock release signal including the most recently updated key 128 to the other lock managers. The transaction journal information and the updated key 124 are stored in the first journal file unit 50a.

The lock release message includes the updated key 128 with the most recent end count information, an indication of the data record, and an indication that the exclusive control is released. Concurrently with the sending of the lock release signal, the first data base access system 36a communicates the transaction information including the journal key 128 to the shared system file 52. On receipt of the lock release message, the second lock manager 34b updates the end count key information 130 in the second merger table 38b and frees the second data base access system 36b to gain access to the previously locked-out data record if requested.

If a second transaction 150 is initiated on the second host processor 30b for the same data record as transaction 100, but after transaction 100 was initiated, the transaction 150 must wait until the second host processor is unlocked from the shared data resource. When the second host computer receives the unlocking message 128, it releases transaction 150 to occur and performs a like sequence pursuing exclusive control of the shared resource of data record as described in conjunction with transaction 100. The key 152 is updated and stored in the shared journal file 52. The key 154 in the lock manager.

If a problem arises in conjunction with the transaction, such as trouble in the communication unit, the host processor, or the like, the transaction ends with an "abnormal end." If the first processor 30a goes down at time 160, the down or abnormal end condition is detected at 162 by the first lock manager 34a. The lock manager updates the shared system control file unit 52, increments the down/restart counter in the first merge table 38a, and sets the transaction end counter to 0 creating merge key 164. The first lock manager informs the other processors that the first host processor is down. The second lock manager 34b updates its merger table by adding the 0 transaction end count in column 106 and the larger down/restart count in column 110 to convert the merge key 154 previously in the merge table 38b to the new merge key 166. Any transactions, performed by the second host processor while the first host processor is down, will reflect the merge key values which indicate to the first processor is down, i.e. the zero in column 106.

Figure 3:
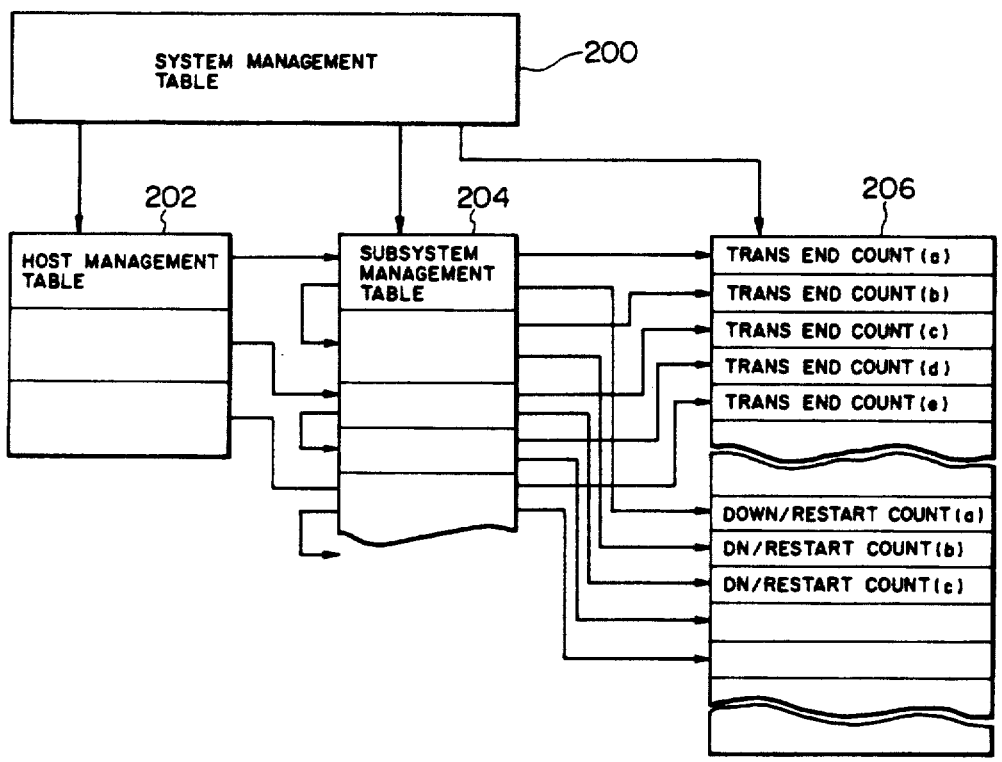
FIG. 3 is a block diagram of the organization of lock manager of the processors of FIG. 1.

With reference to FIG. 3, the lock managers include a system management table 200 stored in the corresponding host processor. A host management table 202 stores the communication status of the host processor, pointers for the host processor control files, and other chain information. The host management table stores information indicating whether the host processor is being operated, is troubled, or has ended. The communication status indicates whether communication with the host processor is possible. A data base access system or sub-system management table 204 stores an identifier of the data base access sub-systems, the sub-system status indicating whether each sub-system is being operated, troubled, or has ended, and the chain information indicating a transaction end count storage position in a journal merge key table 206 corresponding to a given sub-system. The sub-system management table also includes pointers indicating the position of the down/restart counter storage area. The journal merge key table 206 stores the counts for the starts, restarts, ends, and abnormal ends for each of the host computer data base access systems.

Figure 4:
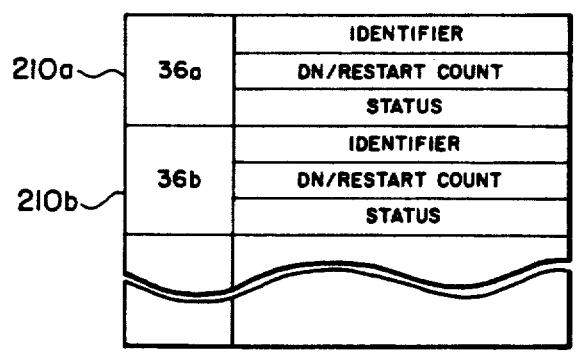
FIG. 4 is a diagrammatic illustration of the data organization in the shared record file of FIG. 1.

With reference to FIG. 4, the shared system file 52 includes a storage area 210a, 210b, and so forth for each of the host processors 30a, 30b, etc. Within each of the host computer storage areas, a storage table is provided for storing an identifier of the host processor, the down/restart count, and the status of the sub-system.

FIG. 5 illustrates the process implemented by the lock manager 34 when a transaction is initiated, e.g. transaction 100 described in FIG. 2. At step 220, the lock manager prepares a portion of a transaction end journal which includes the transaction number and the time of the transaction. At step 222, the lock manager changes the status of the journal merge key. Specifically, the counter 106 of FIG. 2 is incremented. At step 224, the lock manager prepares the journal merge key, i.e. retrieves the counts 104–110 from the merger table. At step 226, the completed transaction record including the transaction number, time, and journal merge key are stored in the host computers journal file 50.

With reference to FIG. 6, at step 230, the lock manager prepares the lock command signal which indicates that the host processor wants to lock the other host processor out of a data record of the shared files. At step 232, the lock manager retrieves the journal merge key created in the method of FIG. 5. At step 234, the retrieved journal merge key and the lock command signal are stored in the same buffer. At step 236, the merge key and the lock command record 114 are sent to the lock managers of the other host processors.

Figure 7:
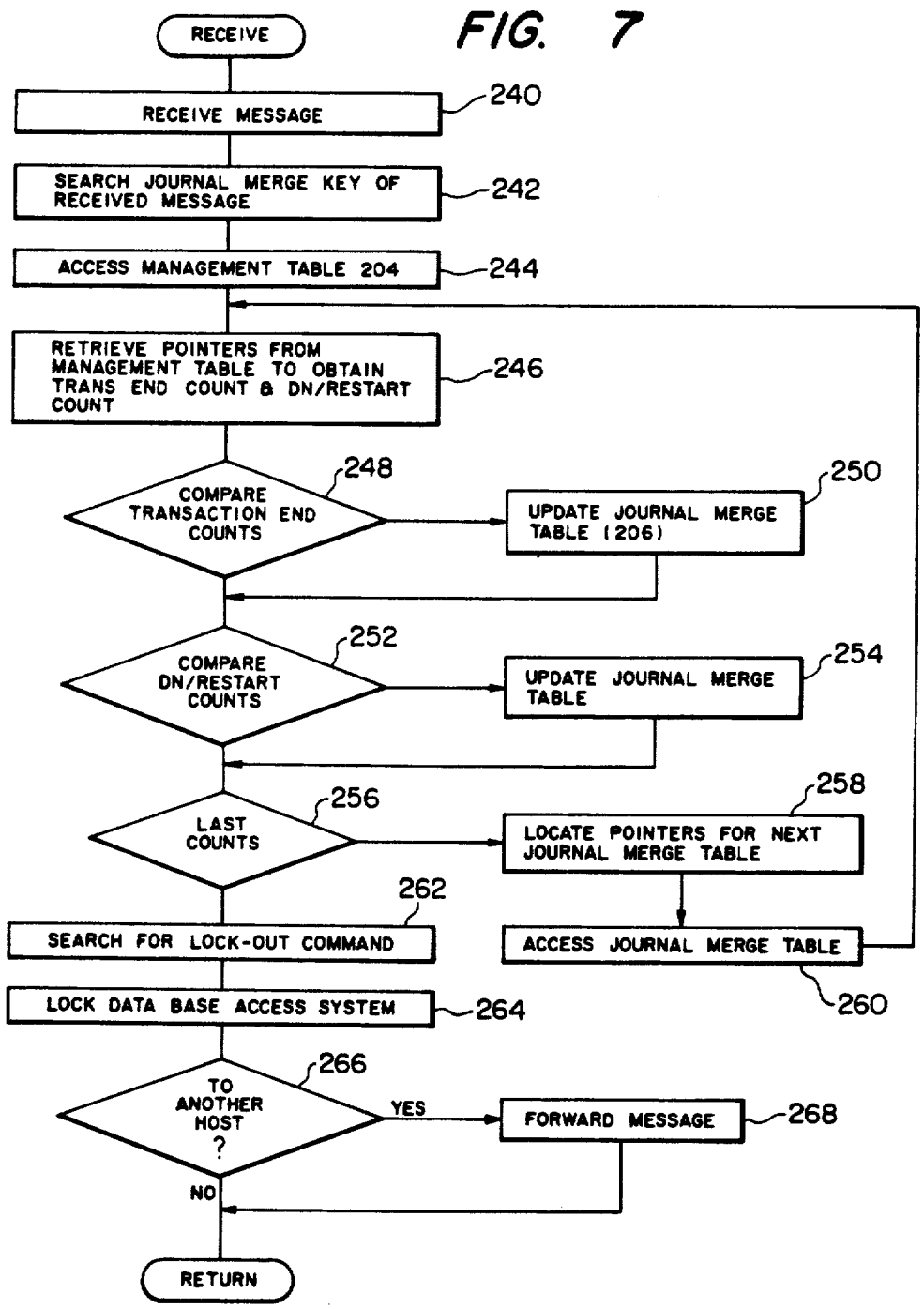
FIG. 7 is a flow chart illustrating operation of the lock manager portion of the processors during a procedure for receiving transfer of control.

With reference to FIG. 7, the other host processor receives the transferred message. In the example of FIG. 1, the second lock manager 34b at step 240 receives the message 114 sent by the first lock manager 34a in step 236. At step 242, the second lock manager searches the journal key of the received message to retrieve count information therefrom, particularly the transaction end and down/restart count of the receiving host processor. At step 244, the lock manager accesses the management table 204 of FIG. 3. At step 246, the lock manager retrieves from the management table 204 the appropriate pointers or addresses to the journal merge key table 206 to obtain the values of the transaction end count and down/restart count therefrom. At step 248, the lock manager compares the transaction end counts from the received message with a transaction end count from the journal/merge table 206. If the two do not match, the lock manager at step 250 updates the journal merge table 206. At step 252, the lock manager compares the down/restart counts from the received message with down/restart counts from the management table 206. If the two do not match, the lock manager stores 254 the larger count in the appropriate storage location of the journal merge key table 206. This process is repeated for counts corresponding to each of the host computers. At step 256, the lock manager determines whether the last of the compared counts has been reached. If not, at step 258, the pointers for the journal merge table of the next host processor in the management table 120 are determined. At step 260, the corresponding journal merge information from the journal merge key table 206 is accessed. Thereafter, the program returns to step 246 and repeats the same procedure for the counts corresponding to the next host computer.

After all the counts have been updated, the second lock manager searches for the lock-out command at 262. At step 264, the lock manager locks its associated data base access system against accessing the named data record. At step 266, the lock manager determines whether the received transaction key indicates that the lock command should be sent to another of the host computers. At step 268, the lock-out message is forwarded to other host computers, if appropriate.

Figure 8:
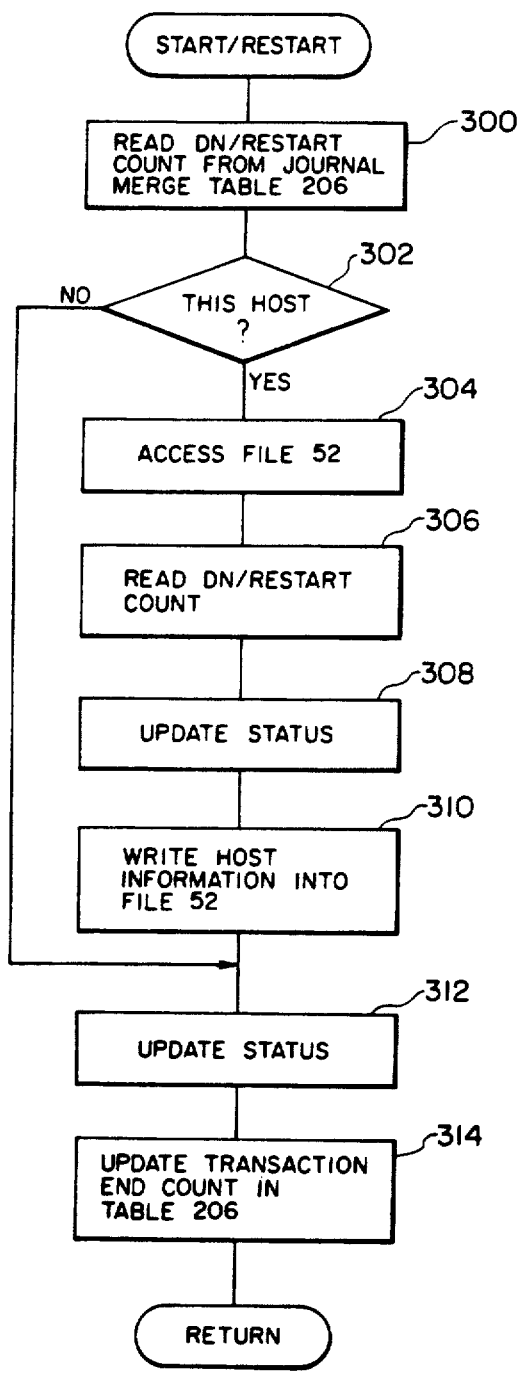
FIG. 8 is a flow chart illustrating start and restart procedures by the lock managers.

With reference to FIG. 8, when a lock manager detects a restart, such as 180 in FIG. 2, it reads 300 the contents of the management table 204 to obtain the pointers to table 206 for the down/restart count and the transaction end count. At step 302, the lock manager determines whether the restart is for the corresponding host processor or a different host processor. If the restart is for the same host processor as the lock manager, at step 304 it reads the information identifying the present host processor from the shared system file 52. At step 306, it reads the down/reset count from the file 52 and enters it into the journal merge table 206 of FIG. 3. At step 308, the lock manager updates the status, i.e. active or down, of the host computer system in the shared system file 52. At 310, the lock manager writes the corresponding host computer information into the shared system files 52. At 312, the lock manager updates the status of the sub-system management table 204. At 314, the lock manager updates the transaction end counter in the merge key table 206 of FIG. 3.

Figure 9:
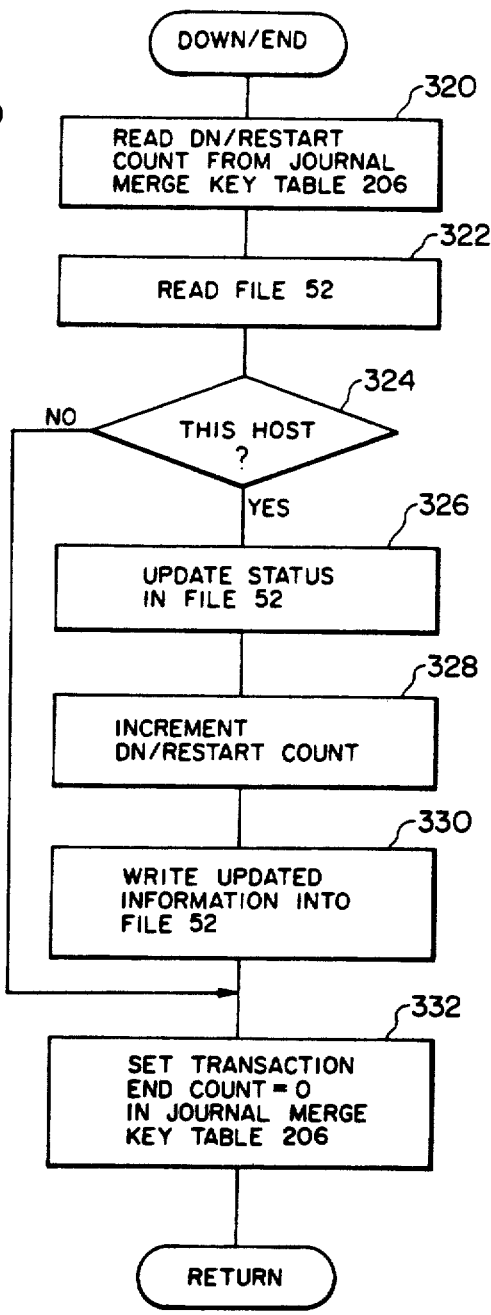
FIG. 9 is a flow chart illustrating end and abnormal end procedures for the lock managers; and, FIG. 10 is a diagrammatic illustration of a procedure for re-establishing transaction sequence in accordance with the present invention.

With reference to FIG. 9, after an abnormal end, the lock manager reads 320 the sub-system management table 204 for the pointers for the transaction end and down/restart counts in the journal merge key table 206. At step 322, lock manager reads the corresponding host processor data base access sub-system status information from the shared system control file 52. At 324, the lock manager determines whether or not the restart is for the present, corresponding host processor system. At 326, the lock manager updates the status in the shared system control file 52, i.e. changes the status from active to down or abnormal end. At 328, the lock manager increments the down/reset counter. At 330, the lock manager writes the updated host computer sub-system information into the shared system file 52. At step 332, the lock manager sets the end transaction count to 0 in the journal merge key table 206, e.g. in the restart example 180 of FIG. 2, sets count 106 to 0.

Reviewing the transaction sequence of FIG. 2 in relation to the flow chart of the program described in conjunction with FIGS. 3-9, the transaction 100 commands the lock manager 34a to lock the selected shared data record of the files 10. The lock manager executes steps 230-236 of FIG. 6 to create a lock signal including the transaction identification, the journal key, and the lock command signal. On receipt of the lock command signal, the receiving lock manager 34a executes steps 240-268 of FIG. 7. That is, the receiving lock manager compares the transaction end and the down/restart counts in its journal merge key table 206 with the corresponding information in the received lock command signal. If the transaction end count is larger in the received signal, the corresponding count in journal merge key table is updated. If the transaction end count is 0 in the received lock command signal, the journal merge key table is not updated. The 0 in the end count table again indicates a troubled ending as shown and discuss in conjunction with the flow chart of FIG. 9. The down/restart counter is also updated in the journal merge key table. In this manner, the receiving lock manager updates the journal merge key table from the form illustrated at 116 and the form illustrated at 118. Step 264 of FIG. 7, the receiving lock manager locks the second processor against assuming control of the designated data records. The receiving lock manager further returns the acknowledgement 120 in which the end and up/down counts of the key corresponding to the second host processor have been updated.

On receipt of the acknowledgement message, the first lock manager 34a performs the update steps 240-260 of FIG. 7 to bring the counts in it's merge key table into conformity with the received acknowledgement message 120, i.e. to create a key as the form shown at 122. The lock manager 34a then returns control of the selected data record to the data base access sub-system 36a. The data base access sub-system retrieves the selected data record from the shared files 10, performs a transaction, and returns the modified data to the shared files. The lock manager updates the key to reflect the completed or ended transaction as described in steps 220-226 of FIG. 5. The transaction journal information with the key 124 are stored in the journal file 50a and the journal merge key table is updated as shown in 126. The lock manager updates the shared data resources file 52 and unlocks the other host processors. Specifically, the lock manager transmits the unlock message 128 including the key 126 and the unlock command. The second or receiving lock manager 34b performs the steps discussed in conjunction with FIG. 7 to update its merger key table 38b in accordance with the key information in the unlock command.

Looking to a further example, after commencement of the transaction 100, the transaction 150 is commenced on the second processor 30b seeking to access the same shared data record. The transaction 150 waits until the second lock manager 34b unlocks the second data base access system 36b to gain access to the common data record. When the second lock manager receives the unlock message 128 it releases the wait of transaction 150. Thereafter, the second lock manager performs the lock sequence discussed above in conjunction with the first lock manager and transaction 100. The lock acknowledgement signals are transferred and the merge tables are compared with the keys in the lock message.

If there is trouble in the communication unit 40, the host processors cannot share information directly with each other. The merge key information of other subsystems remains and is held at the count immediately before the trouble in the communication unit.

If trouble 160 occurs in the host processor, particularly the data base access system, the lock manager at steps 320-330 of FIG. 9 updates the status information in the shared system control file system 52. The down-/restart counter in the journal merge key table is reset at step 328 while the transaction end count value is set to 0 at step 332. The journal merge key 164 represents the merge key achieved by updating the journal merge key table. Transaction end journals acquired thereafter have 0's for the journal end count corresponding to the down host processor.

A transaction 350 is performed while the first data base access system 38a is down. The key 166 is updated to 352 and stored in the journal record file 50b with the transaction data. The key includes 0's for the end transaction count of the first host processor 30a. The key 352 includes the most recent count information for the second host computer 30b and for the down/restart count of the first host computer 30a The merge table is also updated 354.

When the first data base access system 38a is restarted 360, the first lock manager 34a detects the restart 362 and implements the procedure discussed in conjunction with FIG. 8 to restore the key merger table 164. The first lock manager 34a retrieves the most recent end count for the first host processor and increments the down/restart count as illustrated by key 364. The new key is communicated to the second lock manager 34b which implements the procedure illustrated in FIG. 7. The second lock manager updates its merger key table 366 by replacing the 0 representing the first host processor journal end count with the current transaction end count and updates the down/restart. The second lock manager returns an acknowledgement 368 that updates the key 370 of the first merger table.

If the second data base access system 38a goes down 372, the abnormal end procedure illustrated in FIG. 9 is implemented. The second lock manager 34b detects the down 374, increments the down/restart count, and sets the journal end count to 0 as illustrated by key 376. The updated key information is communicated to the first lock manager 34a which updates the first host computer journal end count and down/restart count as journal merge table 378.

A transaction 380 initiated while the second data base access system is down is implemented as described in conjunction with transaction 350. Again, the journal end count corresponding to the first host computer 30a is incremented to update the key from 378 to 382 for storage in the journal file 50a with the transaction information. The journal merge table is also updated 384 to reflect the higher transaction end count.

It will be noted that by comparing the transaction end counts in keys 352 and 382, the order of the transaction is not determinable due to the 0's inserted while the systems were down. However, by comparing the down-/restart counters, the order can be determined. In instances in which the order may still be unclear even after comparing the journal end counts and the up/-down counts, the time or clock information discussed in conjunction with step 220 of FIG. 5 may be called upon. It is to be appreciated that the journal merge key may be stored in individual journals, such as the journal files 50a, 50b, 50c or any user arbitrary journal, analogous to file 52, in which the most recent journal merge key is kept in a central location for access by all host processors.

Figure 10:
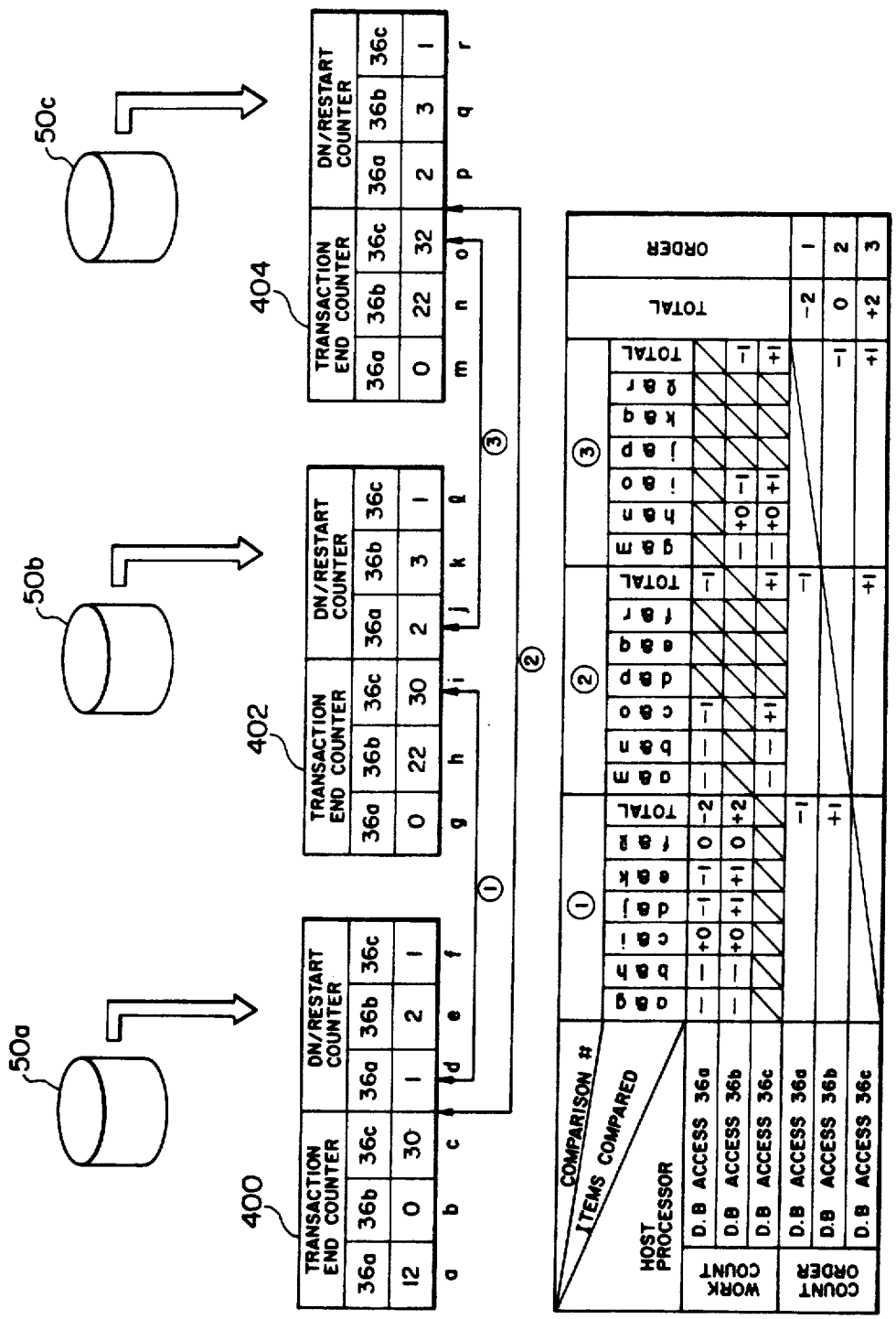

With reference to FIG. 10, a procedure for reestablishing the order of transactions occurring in the three host processors 30a, 30b, and 30c is described. Because there are three host processor systems in the illustrated embodiment, there are three journal end count entries and there down/restart entries for each key. In the example, transactions to be ordered are retrieved from each of the journal files 50a, 50b, 50c to create records 400, 402, and 404 which each include the host processor identification, transaction information, and the like. Moreover, each entry includes a key 410, 412, and 414, respectively. In the illustrated example, key 410 is (12, 0, 30; 1, 2, 1); key 114 is (0, 22, 30; 2, 3, 1); and key 414 is (0, 22, 32; 2, 3, 1).

The journal merge keys 410, 412, and 414 are compared. Work counters 420, 422, and 424 and order determining counters 430, 432, are initialized to 0. First, in a comparison 440, each of the six counts of the first key 410 and the second key 412 are compared. If either of the counts to be compared is 0, no comparison is made. A second comparison 442 compares the first key 410 and the third key 414. A third comparison 444 compares a second key 412 and the third key 414. For each count which is non-zero, the difference is determined, generally 0, −1, +1, −2, +2, or the like. The total of the differences is determined for each comparison. In comparison 440, the journal end count is not determinative of the order. Accordingly, the down/restart counts are also compared. These counts show that the first key 410 precedes, i.e. is more negative than the second key 412. In the second comparison 442, the comparison of the journal end counts, particularly the third journal end count indicates that the first key precedes or is more negative than the third key. Accordingly, the down/restart counts are not compared. In the third comparison, two of the journal end counts are available for comparison. A comparison of the third column shows that the second key count of 30 precedes and is more negative than the third key with a count of 32.

Because of results of the first comparison 440 show that the first key 410 is earlier or more negative than the second key, a −1 is entered in line 430 and the +1 in line 432. This indicates that the first key is earlier or more negative and the second key is later or more positive. The comparison 442, between the first and third keys shows that the first is earlier or more negative than the third. Accordingly, a −1 is entered in line 430 corresponding to the first key and a +1 is entered in line 434 corresponding to the third key. The comparison 444 shows that the second key is earlier than the third key. Accordingly, a −1 if entered in line 432 corresponding to the second key and +1 is entered in line 434 corresponding to the third key. The sums of the lines, illustrated at 450, shows that key 410 is the most negative and key 404 is the most positive. Thus the order illustrated at 452 is that the transaction corresponding to key 410 occurred first, the transaction represented by key 412 occurred second, and the transaction recorded with key 414 occurred third.

The invention has been described with reference to the preferred embodiment. Obviously, modifications and alterations will occur to others upon reading and understanding the preceding detailed description of the preferred embodiments. It is intended that the invention be construed as including all such alterations and modifications insofar as they come within the scope of the appended claims or the equivalent thereof.

Having thus described the preferred embodiments, the invention is now claimed to be:

1. A computer system comprising:
   a plurality of shared files for storing shared information;
   a plurality of host processors for each independently processing transactions and for generating and maintaining end transaction counts each indicating a number of transaction processed by each host processor, each transaction altering information in one of the shared files when communicated thereto, the host processors being operatively connected with the shared files such that each processor can alter shared information in each of the shared files when communication between each processor and the shared files is established;
   a plurality of journal files, each journal file being operatively connected with one of the host processors for storing an accumulated history record of transactions processed thereby and the end transaction counts;
   a communication unit for connecting the processors and providing communication therebetween such that at least the end transaction counts are exchanged among the host processors for updating the end transaction counts stored in the journal files to establish a relative time sequence among the transactions independently performed by the plurality of host processors and stored in the plurality of journal files.

2. The computer system as set forth in claim 1 wherein each of the processors includes a merge table which stores at least a count of the number of transactions performed by each processor, the number of transactions being updated by communication among the processors through the communication unit, the transaction counts stored in the journal files providing the sequence data.

3. The computer system as set forth in claim 2 wherein each journal merge file further stores a count indicating at least one of the down and restart occurrences of each processor, whereby the merge table include the count indicative of the number of transactions performed by each processor and the count indicative of the number of times with each processor has been down or restarted.

4. The computer system as set forth in claim 2 further including a shared system file operatively connected with each of the processors for storing at least the transaction counts therein.

5. A computer system comprising:
   a plurality of shared files for storing shared information;
   a plurality of host processors for independently performing transactions and for generating and maintaining transaction sequence data, each processor including a data base access system, a lock manager, an operating system, and a journal merge key table for storing the transaction sequence data, each transaction altering information in one of the shared files when communicated thereto, the host processors being operatively connected with the shared files such that each processor can alter shared information in each of the shared files when communication between each processor and the shared files is established;
   a plurality of journal files, each journal file being operatively connected with one of the host processors for storing a record of transactions performed thereby and the transaction sequence data;
   a communication unit for connecting the processors and providing communication therebetween such that the transaction sequence data is exchanged and updated by communication among the processors through the communication unit, to establish a relative time sequence among the transactions independently performed by the plurality of host processors and stored in the plurality of journal files.

6. The computer system as set forth in claim 5 wherein the journal merge key table includes a transaction count means for storing a count of transactions performed by the data base access system of each processor.

7. A computer system as set forth in claim 5 wherein each journal merge key table includes a storage means for storing counts indicative of at least one of: the number of times which the data base access system and operating system of each processor was down and the number of times which the data base access system and operating system at each host processor was restarted.

8. A method of computing comprising:
   storing shared records in shared record files;
   independently processing transactions at each of a plurality of processors which are connected with the shared record filed by a data link means that is at times unavailable for altering stored records, whereby unavailability of the data link means prevents the conducted transactions from altering the stored record in an order conducted;
   exchanging transaction numbers among the processors which numbers identify the order in which the transactions were processed;
   storing a record of each transaction from each of the processors in an associated journal file, each stored transaction record including the exchanged transaction numbers;
   at time that the data ink is available to one of the processors, altering the stored shared records in accordance with the transaction records stored in the journal file associated with the one processor and the transaction numbers.

9. The method as set forth in claim 8 further including counting a number of transactions performed by each processor, the transaction count being exchanged among the processors as the sequence information.

10. The method as set forth in claim 9 wherein the sequence information which is stored with each transaction includes an indication of the transaction count of each of the plurality of processors.

11. The method as set forth in claim 10 further including retrieving transaction records from the separate files and comparing the transaction counts to determine an order in which the transactions occur.

12. The method as set forth in claim 10 further including each time one of the processors goes down and is restarted, counting at least one of the number of downs and restarts corresponding to each processor, the down-/restart count being exchanged among the processors and being stored with each transaction record as a part of the sequence information.

13. The method as set forth in claim 12 further including retrieving the stored transaction counts from the separate files and comparing the transaction count corresponding to each transaction to determine which occurred first.

14. The method as set forth in claim 13 wherein when the transaction count comparison is ambiguous regarding order, comparing the down/restart counts.

15. The method as set forth in claim 10 further including storing at least the transaction number counts stored in each of the separate files in a shared file which is shared by all of the processors such that the shared file includes a record of at least the most recent transaction counts.

16. In the computer system including a plurality of host data processors for independently processing transactions, a communications unit for providing a data communication among the processors, a plurality of shared files for storing data resources, and a file unit for each processor for storing transaction information corresponding to the transactions conducted by the corresponding processor, a journal merge method comprising:

exchanging among the processors sequence information indicative of a transaction order in which the processors processed the transactions independently processed by the processors;

after each transaction performed by one of the processors, storing a record of the transaction and the exchanged sequence information in the corresponding file unit;

accessing the shared files with each of the host data processors to store the transaction records in an order that differs in part from the transaction order.

17. The method as set forth in claim 16 further including:

retrieving the stored transaction records from the file units, each retrieved transaction record including the stored sequence information; and, comparing the sequence information stored in conjunction with each transaction record to determine a sequence in which the transactions were conducted.

18. The method as set forth in claim 17 further including at the commencement of each transaction communicating a lock command to the other processors which establishes exclusive control of a designated record of the shared file, the lock command communication including the sequence information, whereby the sequence information is updated concurrently with each lock command transmission.

19. The method as set forth in claim 18 further including counting a number of transactions performed by each processor, the transaction count being communicated among the processors as the sequence information.

* * * * *

UNITED STATES PATENT AND TRADEMARK OFFICE
CERTIFICATE OF CORRECTION

PATENT NO. : 5,151,988
DATED : September 29, 1992
INVENTOR(S) : Mamio Yamagishi

It is certified that error appears in the above-identified patent and that said Letters Patent is hereby corrected as shown below:

Claim 1, column 11, line 37, delete "transaction" and replace with --transactions--.

Claim 3, column 12, line 3, delete "include" and replace with --includes--.

Claim 3, column 12, line 5, delete "with" and replace with --which--.

Claim 8, column 12, line 55, delete "filed" and replace with --files--.

Claim 8, column 12, line 67, delete "ink" and replace with --link--.

Signed and Sealed this

Twenty-first Day of December, 1993

Attest:

BRUCE LEHMAN

*Attesting Officer*  *Commissioner of Patents and Trademarks*